United States Patent [19]
Lovendahl

[11] 3,989,264
[45] Nov. 2, 1976

[54] ARTICULATED BOAT TRAILERS

[76] Inventor: Norman H. Lovendahl, 814 N. Clinton, River Forest, Ill. 60305

[22] Filed: Nov. 5, 1975

[21] Appl. No.: 628,918

[52] U.S. Cl. ................................ 280/401; 280/511; 280/414 R
[51] Int. Cl.² ...................... B62D 53/06; B60P 3/10
[58] Field of Search ................ 280/401, 511, 414 R, 280/639; 296/23 B, 23 F, 27

[56] References Cited
UNITED STATES PATENTS

| | | |
|---|---|---|
| 2,080,709 | 5/1937 | Hall .................................. 280/401 |
| 2,809,046 | 10/1957 | Andersson ...................... 296/27 X |
| 3,584,753 | 6/1971 | Voeller .......................... 296/23 B X |
| 3,831,982 | 8/1974 | Bernhardt et al. ................. 280/511 |

Primary Examiner—Robert R. Song
Assistant Examiner—R. Schrecengost
Attorney, Agent, or Firm—Alter and Weiss

[57] ABSTRACT

An articulated boat trailer for transporting small boats to and from launching sites. After the boat is launched, the trailer can be folded up onto the rear of the towing automobile without having to remove it from the hitch. Thus, the towing automobile and trailer, can be parked in a normal parking space.

9 Claims, 6 Drawing Figures

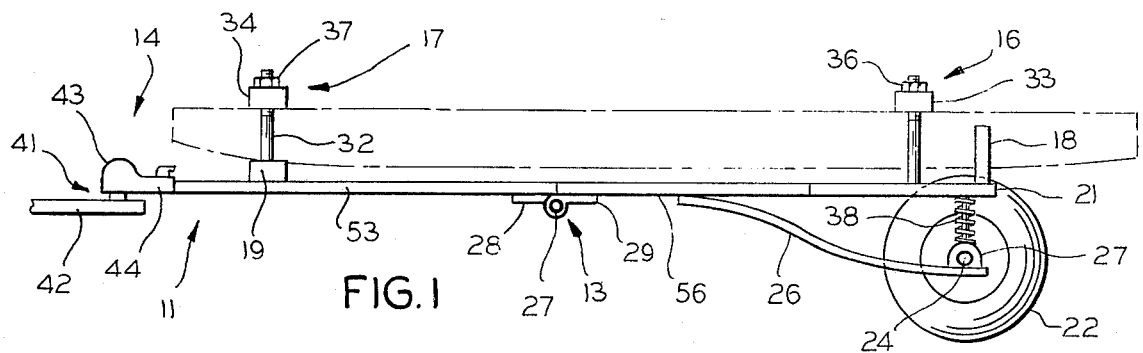
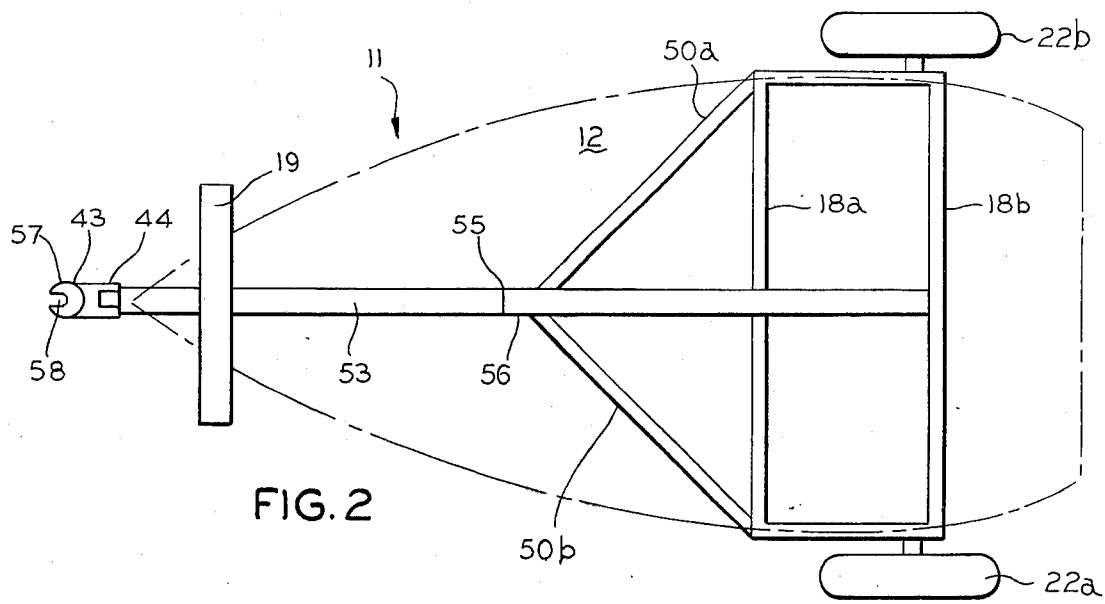
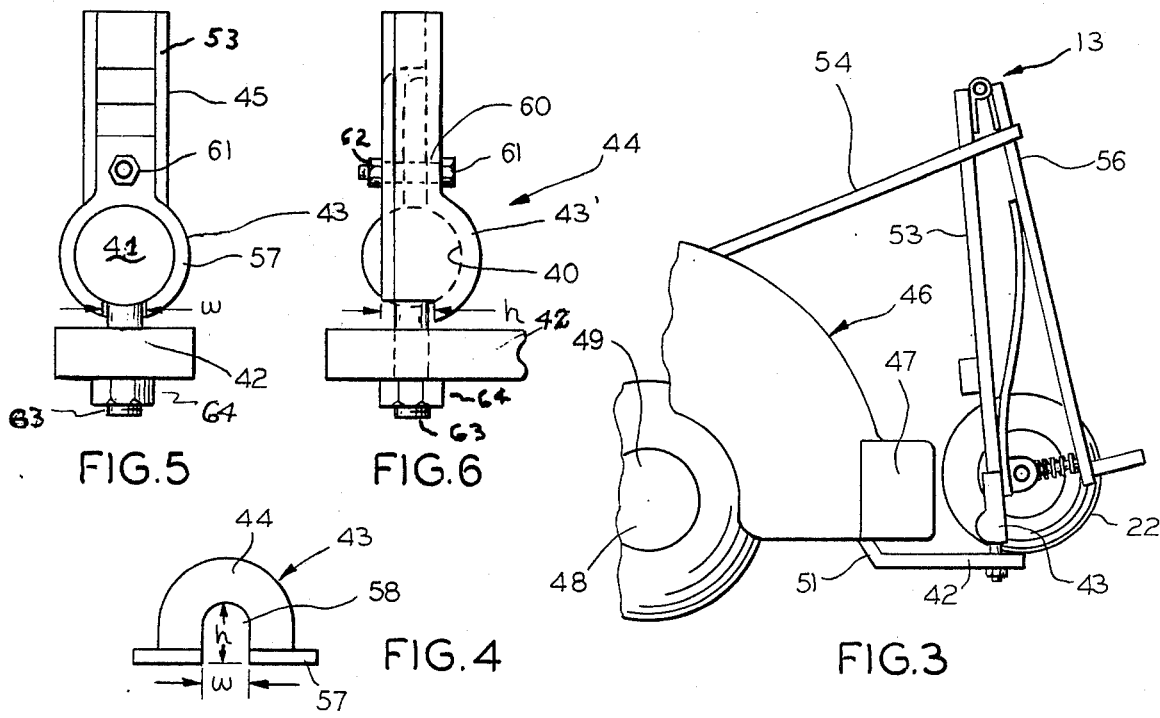

ARTICULATED BOAT TRAILERS

This invention relates to trailers for transporting small boats; and more particularly, to articulated trailers which can be collapsed and stored without unhitching them from the automobile.

One of the problems of concern to small boat users is the parking of the automobile and trailer after the boat is launched. This problem has become even more acute as the popularity of small boat ownership has increased and available parking space has not kept up with the demand. Further, there are many launching sites which do not even provide any parking facilities.

Some of the small boat users, such as people using "sun fishes" are forced to transport the small boat atop their automobile. This involves, of course, using some type of carry-all on top of the automobile, to protect the finish of the automobile.

Even where adequate facilities are provided for parking the automobile and the trailer, there are many occasions when, after the boat is launched, and the trailer is still attached to the car, the automobile has to be used. In that case the driver of the automobile has to lug the long trailer around or disconnect the trailer and leave it at the launching site, with all the bother and risk that entails.

Trailers for small boats, of course, have to be stored during off-season. At that time the boat may be stored on a rack in a garage, for example, and then it is important to be able to store the trailer in the smallest possible space. To this end there is, in the prior art, many collapsible and foldable boat trailers.

Some of the prior art boat trailers use telescoping or detachable parts, whereby the trailers can be stored in the smallest possible space. Others used hinged parts so that the trailers may be folded for storage. Other means for transporting boat, in the past, have included using the boat itself as a trailer. In such cases wheels are attached to the small boat frame and some type of hinge arrangement is used to attach the wheeled boat to the automobile for transportation.

All of these types of boat trailers provided in the past, among other things, have not afforded the user the ability for storing the trailer right on the automobile so that the automobile and trailer can be parked, in a regular parking space.

Accordingly, an object of the present invention is to provide boat trailers enabling storage directly on the automobile. This storage is accomplished without the necessity of using a carry-all.

A related object of this invention is to provide boat trailers which are articulated to aid in accomplishing the storage directly on the automobile and also to enable storage on the trailer away from the automobile in the smallest possible space.

Still another object of the present invention is to provide a boat trailer that is sufficiently sturdy to properly secure the boat during transportation with safety and reliability.

Still another object of the present invention is to provide boat trailers which can easily be attached to the automobile, and can be readily be folded up, while attached to the automobile, even by the younger members of the family.

Still a further object of the present invention is to provide boat trailers which can be detached and folded with a minimum amount of effort.

The above mentioned and other objects and features of the invention will become more apparent after considering the following description of an illustrative embodiment taken in conjunction with the accompanying drawings, in which:

FIG. 1 is a side view of the boat trailer shown with a small boat thereon attached to an automobile hitch;

FIG. 2 is a plan view of the articulated trailer;

FIG. 3 is a view of the articulated boat trailer folded on the back of an automobile with the hitch still attached;

FIG. 4 is a front view of the socket of the ball and socket hitch showing a cut-away portion thereof;

FIG. 5 is a front view of the ball and socket hitching arrangement; and

FIG. 6 is a side view of the ball and socket hitching arrangement with the trailer folded upward showing the effect of the cut-away portion of the socket manipulating the folded trailer while preventing it from striking the automobile.

The side view of FIG. 1 shows the articulated boat trailer generally as 11 having a small boat 12 positioned thereon. The trailer as shown, is in its position for use; that is, it is not folded about an articulated joint 13, and is attached to an automobile (not shown) at hitch 14. The boat 12 removably is affixed to the trailer 11 using attaching means, such as retaining clamps 16 and 17. Shaped or characterized bottom clamp blocks and skids 18 and 19 for receiving and protecting the hull of the boat are shown affixed to the bed 21 of the trailer. A pair of wheels indicated as 22a and 22b are attached to the rear of the bed by means, such as journaled and springed standard 23, affixed to axle 24 of the wheel and to the end of the bed 21, in any well known manner.

Alternatively, the axle can be affixed to the bed 21, by resilient means, such as leaf spring 26. The leaf spring may be attached to the axle by the journal 27 and affixed to the bed of the trailer by any well known fastener means.

The articulated means 13 is shown as hinge pin 27 and hinge plates 28, 29. The hinge is of the type that turns inwardly; i.e. both hinge plates turn toward each other around the hinge pin in a downward direction and are astopped from turning towards each other in the upward direction, as shown in FIG. 1.

In FIG. 2 the boat 12 is shown in a fathom view. The trailer bed in the preferred embodiment of FIG. 2 includes a central beam, generally shown as beam 7, comprised of a front portion 53 and a rear portion 56 joined together by articulated means 17. Above the articulated means of the longitudinal beam 7 is shown the split 55 between the front section 53 and rear section 56 of the longitudinal beam. Biased members 50a and 50b are shown bracing the rear cross members, such as rear cross member 66, 67. The clamps are blocks and are not shown in FIG. 2 to avoid any confusion.

The clamp means 16 and 17 (FIG. 1) are shown as comprising fasteners, such as threaded studs 31 and 32, permanently affixed to the bottom clamp blocks 18 and 19 of the trailer 11. Top clamp straps or blocks 33, 34 are attached between each pair of the oppositely disposed studs to reach across the boat and firmly affix it onto the trailer. Threaded fastener means, such as nuts 36 and 37 are used for holding the clamping blocks 33 and 34, to studs 31 and 32, respectively.

The hitch 14 is a ball and socket type hitch wherein the ball portion 41 is affixed to the rear of the automobile by bracket means indicated as 42. The socket portion 43 is attached by means, such as threaded fastener 44 at the front end 53 of the trailer beam 7.

FIG. 3 illustrates the trailer folded around its articulated joint, while still attached to the automobile. The back portion of the automobile is generally shown as 46. The back portion includes the bumper means 47, the rear wheel 48, and the rear axle 49. The bracket means 42 is attached to the rear of the automobile at 51, in any well known manner, and reaches below and past the bumper 47.

The socket 43 is characterized in a manner that enables the rotation of the socket around the ball so that the front half of the trailer bed 53 extends beyond the normal vertical position and leans towards the back of the car. Attached around the folded trailer bed 21 is retaining means 54. The retaining means may be a canvas type strap, such as is well known for attaching things to automobiles, or it may be made out of rubberized standard wire type of material, or the like.

The trailer bed is folded around its articulated joint 13 with the rear end 56 of the trailer bed bent towards the front half 53. The wheels 22 mounted on the rear end are sufficiently far apart to overlap the front half of the trailer. More articulated joints could be used to enable folding a longer trailer amenable for storage on the automobile, while still attached thereto.

Details of the socket are shown in FIGS. 4, 5 and 6. FIG. 4 shows a view looking from the rear of the automobile towards the hitch arrangement with the socket in a position over the ball, while the trailer is used for transporting a boat.

Means are provided for controlling the limits to which the socket and trailer attached thereto can be moved relative to the ball. More particularly, the socket has a cut-out portion 58 having a height "$h$" and a width "$w$" as shown. As shown particularly in FIGS. 3, 4 and 5, the height and width of the cut-out controls the tilt of the front end of the trailer bed 12 past the normal (as shown in FIG. 3). The width controls the side tilt, as shown particularly in FIG. 4, The socket is shown as a hollow semisphere 44 having a flange 57 at the bottom thereof.

Looking now at FIG. 5, therein is shown a front view of the hitch arrangement connecting the trailer to the automobile through bracket 42. It is seen that the width "$w$" of the cut-out 58 is wider than the width of the bracket 42. The amount of this width controls side tilt.

The socket 43 is connected to the longitudinal beam section 53, in any well known manner. Socket 43 is locked over the ball 41 in a usual manner through the use of a fastener, such as nut and bolt 61 and 62, respectively.

As can be seen in FIG. 6, the height "$h$" of the cut-out 58 controls the amount of vertical tilt the front end of the longitudinal beam 52 has from the normal vertical. The ball 41 of the hitch 14 is shown within the socket 43; while the ball is shown attached to bracket 42 by means, such as stud 63 and nut 64. The height "$h$" is sufficiently large to enable the section 53 to tilt toward the automobile, when the trailer is in the folded "on car" storage position.

In operation, the trailer 11 is unfolded, The boat 12 is loaded onto the trailer and clamped in place. The trailer is hitched to the automobile using hitch means 14. After unloading the boat the trailer is folded around the hinge means, while still attached at hitch means 14 and strapped in place with retaining means 54. The trailer is easy to fold, and the automobile can be parked readily, or can be driven even with the trailer attached.

While the principles of the invention have been described in connection with specific apparatus and applications, it is to be understood that this description is made by way of example, and not as a limitation on the scope of the invention.

I claim:
1. A boat trailer arrangement,
 said arrangement comprising trailer bed means,
 clamp means for clamping a boat to said trailer,
 wheel means attached to said trailer bed,
 ball and socket hitch means for hitching said trailer to the rear of a towing automobile,
 said hitch means including maintaining means for enabling lifting said trailer bed from a horizontal position to a substantially vertical position, while maintaining said trailer hitched to the towing automobile with wheel means still attached.

2. The boat trailer arrangement of claim 1 wherein said hitch means comprises a socket coupled to said trailer and a ball coupled to said automobile,
 said maintaining means comprising a cut-out portion at the front end of said socket.

3. The boat trailer arrangement of claim 1 wherein the bed of the trailer comprises a single longitudinal beam articulated at substantially its midpoint,
 cross beam means attached to said longitudinal beam at substantially the rear thereof,
 biased means securing said cross beams to said longitudinal beam,
 said wheel means comprising a pair of spaced apart oppositely disposed wheels, and
 means for attaching said pair of wheels to substantially the far end of said trailer.

4. An improved boat trailer comprising a longitudinal beam,
 hitch means at the front end of said longitudinal beam,
 wheel means attached at the rear end of said longitudinal beam,
 means for articulating said longitudinal beam,
 said hitch means for attaching said trailer to an automobile comprising a socket for receiving a ball therein,
 said improvement including a cut-out in said socket for enabling lifting said longitudinal beam from its normally substantially horizontal position to a substantially vertical position, while remaining hitched to said automobile.

5. A boat trailer arrangement,
 said arrangement comprising trailer bed means,
 clamp means for clamping a boat to said trailer,
 wheel means attached to said trailer bed,
 hitch means for hitching said trailer to the rear of a towing automobile,
 said hitch means comprising a socket coupled to the said trailer and a ball coupled to said automobile, and
 said socket having a cutout portion at the front end thereof for enabling lifting said trailer bed from a horizontal position to a substantially vertical position while maintaining said trailer hitched to the towing automobile.

6. The boat trailer arrangement of claim 5 wherein the width of this cut-out portion is small enough to prevent said lifted trailer from falling sidewise.

7. The boat trailer arrangement of claim 5 comprising means for enabling the folding of said trailer bed.

8. The boat trailer arrangement of claim 7 wherein said means for folding comprises hinge means between a front portion of said trailer and a rear portion of said trailer which enables lifting the front portion of the trailer and having the bottom of the rear portion juxtaposed to the bottom of the front portion of said trailer.

9. The boat trailer arrangement of claim 8 including means for securing the lifted trailer in its lifted position.

\* \* \* \* \*